L. S. STARRETT & J. A. ADELL.
INSIDE CALIPER GAGE.
APPLICATION FILED AUG. 10, 1908.

905,110.

Patented Nov. 24, 1908.

WITNESSES
O. T. Palmer
L. F. Darling

INVENTORS
Laroy S. Starrett
John A. Adell
by A. N. Benson attorney

UNITED STATES PATENT OFFICE.

LAROY S. STARRETT AND JOHN A. ADELL, OF ATHOL, MASSACHUSETTS, ASSIGNORS TO THE L. S. STARRETT CO., OF ATHOL, MASSACHUSETTS, A CORPORATION OF MASSACHUSETTS.

INSIDE-CALIPER GAGE.

No. 905,110.  Specification of Letters Patent.  Patented Nov. 24, 1908.

Application filed August 10, 1908. Serial No. 447,713.

*To all whom it may concern:*

Be it known that we, LAROY S. STARRETT and JOHN A. ADELL, both of Athol, in the county of Worcester and State of Massachusetts, have invented certain new and useful Improvements in Inside-Caliper Gages, of which the following is a specification.

The object of this invention is to provide a self-adjusting gage to quickly and accurately take inside measurements which measurements may be transferred to outside calipers or micrometers by which loose fits, tight fits or shrink fits, in thousandths, may be correctly determined.

The invention consists, briefly, in a telescoping, spring-actuated and locking gage of peculiar construction, as herein illustrated, described and claimed.

Figure 1:
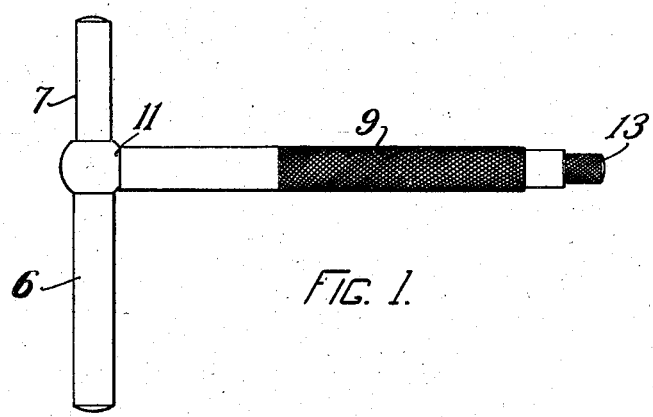
Figure 2:
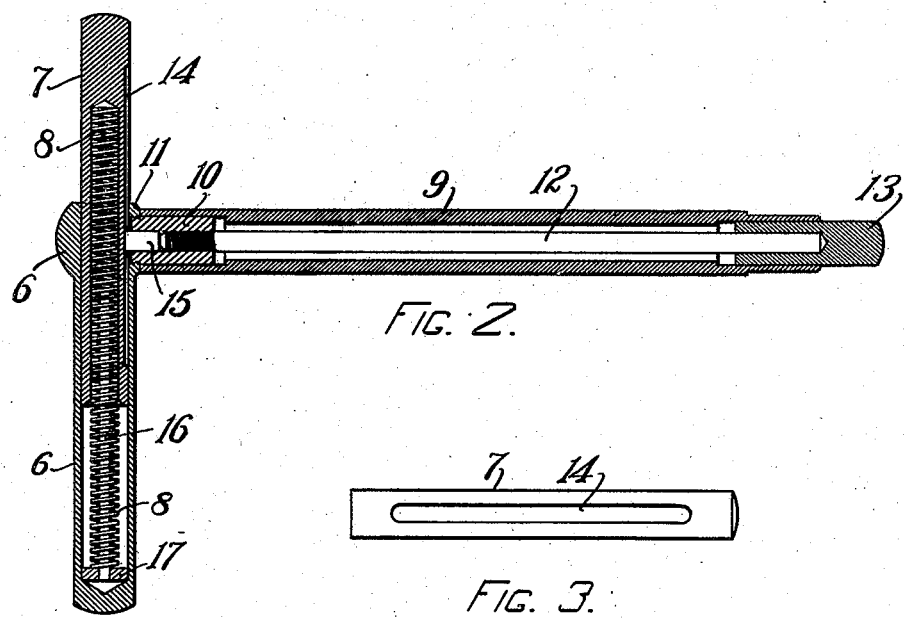
Figure 3:
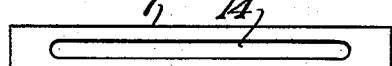

In the drawing, Figure 1 is an elevation of one of these gages, complete. Fig. 2 is an enlarged longitudinal section thereof, and Fig. 3 a view of the grooved beam-extension detached.

Our improved gage consists, essentially, of a tubular beam or head-portion 6 and its grooved telescoping extension 7, with an inclosed spring 8, tending to keep said parts in extended position; a tubular handle 9 perpendicular to said beam and having at its inner end an internally threaded rigid bushing 10, also threaded externally at its tip, (which projects slightly beyond such handle end), to engage an internally threaded hub 11, formed on the side of beam 6; also an axial locking bolt 12, in the handle, threaded at tip to engage in bushing 10 and rigidly secured at its outer end to a rotatable terminal plug 13, projecting from the handle, both being knurled externally to facilitate the operation. The beam extension 7 has a longitudinal groove 14, with abrupt ends, (see Figs. 2 and 3), to receive the end of bolt 12 or the adjacent lock-pin 15, held in the slightly enlarged axial cavity at the end of bushing 10 and actuated by rotation of threaded lock-bolt 12. This movement locks the parts when the desired internal measurement has been effected, or releases them for further use, the lock-pin end in said groove preventing the beam extension from being thrown unduly outward by expansion of spring 8. Lock-pin 15 may be integral with lock-bolt 12 for this service, but would require either a limited releasing movement of the bolt or a deeper slot in the beam extension; therefore the separate pin is preferred. Spring 8 is axially supported by a guide rod 16 fixed in the guide base 17, see Fig. 2.

In making measurements with this device, the lock being released, the beam-extension 7 is pressed into beam 6 against the slight resistance of spring 8, and the members so compressed are placed within the cavity to be measured and are released. The internal pressure separates such members until their rounded ends bear against opposite walls. The parts are then locked, by rotating bolt 12 by its plug 13, causing the bolt tip, or preferably the lock-pin 15, to bear frictionally in groove 14 of the beam-extension, thus retaining the dimension indicated. The gage can then be tested by a caliper or any proper measuring instrument, and the exact internal dimension ascertained.

These gages will naturally be made in sets of different sizes for use under varying circumstances. The automatic extension feature, controlled by the operator's thumb and finger, and the simple lock instantly operative, adapt the device for general use.

We claim as our invention:

1. The tubular beam, its telescoping extension and inclosed spring, in combination with the handle fixed perpendicularly to said beam and with the rotatable terminal plug and locking bolt having a threaded engagement within the handle, to lock and to release the telescoping members.

2. The tubular beam 6, grooved telescoping extension 7 and inclosed spring 8, in combination with the tubular handle 9 having a rigid bushing 10 fixed perpendicularly to said beam, and with the locking bolt 12 threaded at tip to engage within said bushing and provided with a rotatable terminal plug for locking and releasing said telescoping parts.

3. The tubular beam 6 and grooved telescoping extension 7 forming with the inclosed spring 8 the head of the instrument; the tubular body 9 having at its inner end a fixed bushing 10 axially perforated and threaded externally and internally, such parts forming the handle, in combination with locking and releasing means comprising the threaded lock-bolt 12 engaging said bushing and having a projecting rotatable plug, and with the lock-pin 15 at the tip of bolt 12 in the bushing perforation, to engage the groove in beam extension 7.

In testimony whereof we have affixed our signatures, in presence of two witnesses.

LAROY S. STARRETT.
JOHN A. ADELL.

Witnesses:
FRANK E. WING,
WILLARD G. NIMS.